United States Patent Office 2,838,509
Patented June 10, 1958

2,838,509

9-AMINOALKYL-9-XANTHENECARBOXAMIDES

John W. Cusic, Skokie, Ill., assignor to G. D. Searle & Co., Chicago, Ill., a corporation of Delaware No Drawing. Application October 2, 1956
Serial No. 613,393

11 Claims. (Cl. 260—247.2)

The present invention relates to a new group of amides and, more particularly, to 9-aminoalkyl-9-xanthenecarboxamides, their derivatives and to methods for their preparation.

The compounds which are the subject matter of this invention are the bases of the structural formula

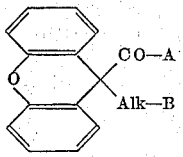

and the salts thereof wherein Alk is a lower alkylene radical and wherein A and B are members of the class consisting of amino radicals, lower alkyl substituted amino radicals, lower alkenyl substituted amino radicals, lower hydroxyalkyl substituted amino radicals and nitrogen-containing heteromonocyclic radicals.

In the foregoing structural formula the radical Alk is a lower alkylene radical derived from a straight-chained or branched hydrocarbon such as methylene, ethylene, propylene, butylene, amylene, hexylene or a polymethylene radical such as trimethylene, tetramethylene, pentamethylene and hexamethylene. Among the radicals which A and B can represent are amino radicals of the type NRR', wherein R and R' are hydrogen, such straight-chained and branched lower alkyl groups as methyl, ethyl, propyl, butyl, amyl and hexyl, lower alkenyl radicals such as allyl, methallyl, and crotyl, and lower hydroxyalkyl radicals such as hydroxyethyl, hydroxypropyl, and the like. The radicals A and B can also represent saturated nitrogen-containing heteromonocyclic groups such as morpholine, thiamorpholine, piperazine, ketopiperazine and alkylpiperazine radicals. Of particular interest are compounds in which A and/or B represent radicals of the type

wherein Z is a lower alkylene radical of 4 to 7 carbon atoms of which 4 to 5 are in nuclear position, for example N-pyrrolidine, piperidine, alkylpyrrolidine and alkylpiperidine radicals.

The organic bases of the foregoing type form salts which are non-toxic in therapeutic dosage with a variety of inorganic and organic acids including sulfuric, phosphoric, hydrochloric, hydrobromic, sulfamic, citric, lactic, maleic, malic, succinic, tartaric, cinnamic, acetic, benzoic, gluconic, ascorbic and related acids, chlorotheophylline, bromotheophylline and the like. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The object of this invention is to provide new chemical substances of the type indicated above. These new amides have a quinidine-like regulatory effect on the heart action and antagonize hypertension.

The examples below illustrate in detail some of the compounds which comprise this invention and methods for their production. However, the invention is not to be construed as limited thereby in spirit or in scope. It will be apparent to those skilled in the art that numerous modifications in materials and methods can be adopted without departing from the invention. In these examples, quantities of materials are indicated in parts by weight.

This application is a continuation-in-part of the copending application Serial No. 450,804 filed August 18, 1954, now abandoned.

*Example 1*

A mixture of 95 parts of the methyl ester of 9-xanthenecarboxylic acid, 11 parts of lithium amide, 60 parts of β-chloroethyldiethylamine and 450 parts of toluene is stirred and refluxed for 8 hours and then cooled and extracted with dilute hydrochloric acid. The extract is rendered alkaline by addition of dilute sodium hydroxide and extracted with ether. The ether solution is dried over anhydrous calcium sulfate, filtered and evaporated to yield the methyl ester of 9-(β-diethylaminoethyl)-9-xanthenecarboxylic acid. Treatment of a butanone solution of this base with alcoholic hydrogen chloride and recrystallization from a mixture of ethyl acetate and isopropanol yields the hydrochloride melting at about 153–154° C.

Treatment of a solution of 8 parts of this base in 40 parts of butanone with 11.4 parts of iodomethane, cooling and crystallization of the precipitate from dilute isopropanol yields the methiodide melting at about 207–208° C.

A mixture of 15 parts of the methyl ester of 9-(β-diethylaminoethyl)-9-xanthenecarboxylic acid, 120 parts of a saturated solution of ammonia in methanol and 0.05 parts of sodium methoxide are maintained in a shielded pressure reactor for 5 days at 80° C., cooled and concentrated until most of the solvent has been evaporated. The semisolid residue is dissolved in a mixture of benzene and petroleum ether and chilled. The resulting precipitate of the 9-(β-diethylaminoethyl)-9-xanthenecarboxamide is dissolved in benzene and treated with 1.1 equivalents of alcoholic hydrogen chloride. The semisolid precipitate is crystallized from isopropanol and the hydrochloride thus obtained melts at about 222–223° C. The salt has the structural formula

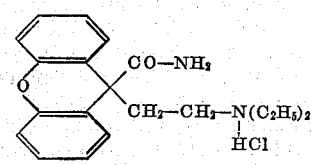

The same compound can be prepared by the following procedure. A solution of 10 parts of the methyl ester of 9-(β-diethylaminoethyl)-9-xanthenecarboxylic acid in 100 parts of ethanol is boiled with 50 parts of an 0.1–N aqueous solution of sodium hydroxide under reflux for 4 hours. The ethanol is then boiled off and the residue is cooled and neutralized with carbon dioxide. 5 parts of the resulting precipitate of the 9-(β-diethylaminoethyl)-9-xanthenecarboxylic acid are dissolved in 70 parts of a saturated solution of ammonia in methanol and heated for 24 hours in an autoclave. The mixture is then concentrated almost to dryness and the residue is worked up as above to yield the hydrochloride of 9-(β-diethylaminoethyl)-9-xanthenecarboxamide melting at about 222–225° C.

Example 2

A mixture of 75 parts of the methyl ester of 9-xanthenecarboxylic acid, 40 parts of β-chloroethylpyrrolidine, 10 parts of lithium amide and 450 parts of anhydrous toluene is stirred and refluxed for 12 hours, cooled and extracted with acid. This extract is rendered alkaline and extracted with ether. The ether solution is dried over anhydrous potassium carbonate, filtered and evaporated to yield the methyl ester of 9-(β-pyrrolidinoethyl)-9-xanthenecarboxylic acid.

A mixture of 16 parts of this ester, 120 parts of a saturated solution of ammonia in methanol and 0.5 part of sodium methoxide is maintained in a shielded pressure reactor at 25° C. for 3 days, cooled and reduced to dryness under vacuum. On crystallization from benzene and petroleum ether, the 9-(β-pyrrolidinoethyl)-9-xanthenecarboxamide is obtained. Treatment of a butanone solution with one equivalent of alcoholic hydrogen chloride yields a crystalline hydrochloride which has the structural formula

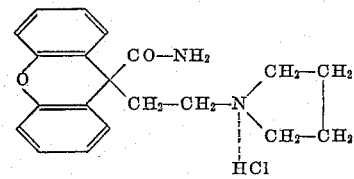

Substitution of 52.5 parts of δ-chlorobutylpiperidine for the β-chloroethylpyrrolidine in the foregoing procedure yields the 9-(δ-piperidinobutyl)-9-xanthenecarboxamide of the structural formula

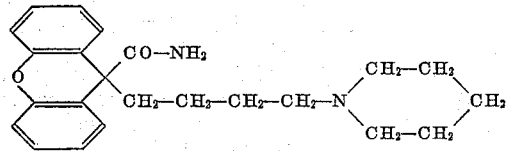

Example 3

A mixture of 48 parts of the methyl ester of 9-xanthenecarboxylic acid, 6 parts of lithium amide, 32.7 parts of β-chloroethyldiisopropylamine and 450 parts of anhydrous toluene is stirred at reflux temperature for 8 hours, cooled and extracted with dilute hydrochloric acid. The extract is rendered alkaline and extracted with ether. This extract is dried over anhydrous calcium sulfate, filtered and evaporated to yield the methyl ester of 9-(β-diisopropylaminoethyl)-9-xanthenecarboxylic acid which is distilled at about 190–200° C. and 1 mm. pressure.

A mixture of 6 parts of the methyl ester of 9-(β-diisopropylaminoethyl)-9-xanthenecarboxylic acid, 60 parts of a saturated solution of methylamine in methanol and 0.2 part of sodium methoxide is maintained for 10 days in a shielded pressure reactor and then concentrated under vacuum to dryness. The residue is recrystallized from a mixture of benzene and petroleum ether to yield the 9-(β-diisopropylaminoethyl)-N-methyl-9-xanthenecarboxamide. The latter is dissolved in butanone and treated with 1.1 equivalents of alcoholic hydrogen chloride. On refrigeration the solid hydrochloride precipitates which has the structural formula

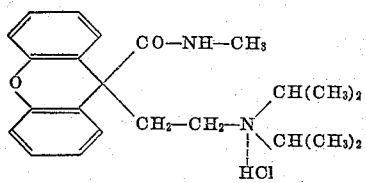

Example 4

In the course of 15 minutes a cooled and agitated solution of 40.5 parts of dimethylamine in 40.5 parts of toluene is treated by the addition of 100 parts of 9-xanthenecarbonyl chloride in 100 parts of toluene. The mixture is permitted to stand at room temperature for 12 hours, after which the precipitated N,N-dimethyl-9-xanthenecarboxamide is collected on a filter, washed with water and recrystallized from methanol. An additional yield is obtained from the filtrate by treatment with hydrochloric acid and concentration of the organic layer. The recrystallized compound thus obtained melts at about 140–141° C.

50 parts of N,N-dimethyl-9-xanthenecarboxamide, 7 parts of lithium amide and 450 parts of anhydrous toluene are refluxed for 30 minutes and then treated in the course of 30 minutes with 30 parts of β-chloroethyldiethylamine while refluxing and stirring is continued. After 6 additional hours of refluxing the reaction mixture is treated with ice and dilute hydrochloric acid and the aqueous layer is separated, rendered alkaline and extracted with ether. This extract is dried over anhydrous potassium carbonate, filtered and evaporated to yield 9-(β-diethylaminoethyl)-N,N-dimethyl-9-xanthenecarboxamide which, on recrystallization from ethanol, melts at about 133–134° C. The compound has the structural formula

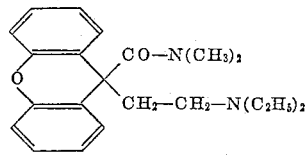

Example 5

A solution of 90 parts of piperidine in 1000 parts of anhydrous toluene is mixed with cooling with 244.5 parts of 9-xanthenecarbonyl chloride and then warmed on the steam bath for 6 hours, cooled and filtered. The filtrate is washed with dilute hydrochloric acid, dried over anhydrous calcium sulfate and evaporated. The 9-xanthenecarbonylpiperidine thus obtained melts at about 152–153° C.

A mixture of 61 parts of the 9-xanthenecarbonylpiperidine thus obtained, 6 parts of sodium hydride and 400 parts of toluene is refluxed for 5 hours and then treated in the course of 45 minutes with 43 parts of γ-bromopropylbutylamine. Refluxing is continued for 5 more hours after which the mixture is treated with ice and dilute hydrochloric acid. The water-soluble layer is separated, made alkaline by addition of dilute sodium hydroxide and extracted with ether. This extract is dried over anhydrous calcium sulfate, filtered and evaporated and the residue is dissolved in butanone. Addition of one equivalent of a 25% solution of hydrogen chloride in isopropanol causes precipitation of the hydrochloride of 9-(γ-butylaminopropyl)-9-xanthenecarbonylpiperidine which has the structural fromula

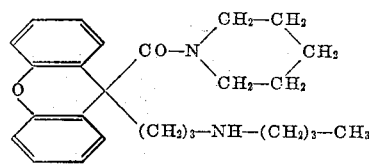

Similar treatment of 61 parts of 9-xanthenecarbonylpiperidine in toluene, first with sodium hydride and then with 27 parts of γ-chloropropylamine yields the 9-(γ-aminopropyl)-9-xanthenecarbonylpiperidine which has the structural formula

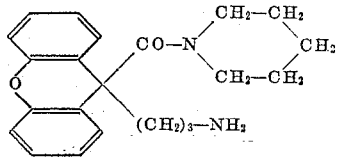

Example 6

To a solution of 42.6 parts of pyrrolidine in 700 parts of toluene, 75 parts of 9-xanthenecarbonyl chloride are added fairly rapidly with cooling. The reaction mixture is warmed on a steam bath for 5 hours and then cooled. The hydrochloride of pyrrolidine is removed by filtration and the filtrate is washed with warm dilute hydrochloric acid and then chilled. The precipitate is collected on a filter, washed and dried. The 9-xanthenecarbonylpyrrolidine thus obtained melts at about 159–160° C.

A mixture of 20 parts of this amide, 3 parts of sodium hydride and 450 parts of toluene is stirred and refluxed for 5 hours and then treated in the course of 30 minutes with 14 parts of β-chloroethyldiethylamine. Refluxing is continued for 2 hours, after which the mixture is cooled and treated with dilute hydrochloric acid. The aqueous layer is separated and rendered alkaline by addition of ammonium hydroxide. An oil separates which solidifies on standing. The precipitate is collected on a filter, dried and recrystallized from petroleum ether. The 9-(β-diethylaminoethyl)-9-xanthenecarbonylpyrrolidine thus obtained melts at about 131–132° C. It has the structural formula

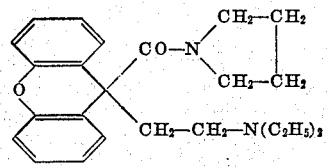

The same compound is obtained as follows: A mixture of 20 parts of 9-(β-diethylaminoethyl)-9-xanthenecarboxylic acid, 10 parts of thionyl chloride and 300 parts of xylene is refluxed for 2 hours, concentrated to about one-third of the original volume and filtered. To the filtrate (containing a xylene solution of 9 - (β - diethylaminoethyl)-9-xanthenecarbonyl chloride) are added 20 parts of pyrrolidine in 200 parts of toluene. After heating for an hour on the steam bath, the mixture is extracted with dilute aqueous hydrochloric acid. The extract is rendered alkaline and extracted with ether. The ether and pyrrolidine are distilled off to yield 9-(β-diethylaminoethyl)-9-xanthenecarbonylpyrrolidine which solidifies on standing. On recrystallization from petroleum ether it melts at about 131–133° C.

Example 7

To a cooled solution of 50 parts of diethylamine in 450 parts of anhydrous toluene are added 48.9 parts of 9 - xanthenecarbonyl chloride. The mixture is then warmed briefly on the steam bath and permitted to stand at room temperature for 12 hours and cooled. A small amount of precipitate is removed by filtration and the filtrate is concentrated under vacuum to leave an oil which solidifies on standing for a short time. Analysis shows it to be N,N-diethyl-9-xanthenecarboxamide. A stirred mixture of 26 parts of N,N-diethyl-9-xanthenecarboxamide, 5 parts of sodamide and 450 parts of anhydrous toluene is refluxed for 40 minutes and then treated by gradual addition with stirring with 18 parts of β-chloroethyldiethylamine. Refluxing is continued for 2 hours after which the reaction mixture is treated with ice and dilute hydrochloric acid and the aqueous layer is separated, rendered alkaline and extracted with ether. This extract is dried over anhydrous potassium carbonate, filtered and evaporated to yield 9-(β-diethylaminoethyl)-N,N-diethyl-9-xanthenecarboxamide as a yellow oil.

Example 8

A mixture of 28 parts of 9-xanthenecarbonylpyrrolidine, 10 parts of sodamide and 450 parts of anhydrous toluene is stirred and refluxed for 2 hours and then treated in the course of 15 to 20 minutes with 18 parts of the hydrochloride of β-chloroethyldimethylamine. Refluxing is resumed for 3 to 4 hours after which the mixture is cooled and extracted with dilute hydrochloric acid. The extract is rendered alkaline and extracted with ether. The ether solution is dried and evaporated to yield as a yellow solid 9-(β-dimethylaminoethyl) - 9 - xanthenecarbonyl-pyrrolidine which, recrystallized from benzene and petroleum ether, melts at about 134–135° C.

Example 9

In the procedure of the immediately preceding example, an equal amount of the hydrochloride of γ-chloropropyldimethylamine is substituted for the β-chloroethyldimethylamine. The 9 - (γ - dimethylaminopropyl)-9-xanthenecarbonylpyrrolidine thus obtained melts at about 119–123° C.

Similar substitution of the hydrochloride of γ-chloropropyldiethylamine yields the 9-(γ-diethylaminopropyl)-9-xanthenecarbonylpyrrolidine which forms a crystalline hydrochloride melting at about 231–232° C.

Example 10

A mixture of 27.9 parts of 9-xanthenecarbonylpyrrolidine, 5 parts of sodamide and 450 parts of dry toluene is refluxed with stirring for 2 hours and then treated by gradual addition with 24.4 parts of β-chloropropyldimethylamine. Refluxing is continued for 3 hours after which the mixture is cooled, treated with 10 parts of ethanol and dilute hydrochloric acid. The acidic extract is washed with ether and then warmed to expel the ether. Upon addition of an excess of ammonium hydroxide, a heavy oil precipitates which solidifies on standing. The 9 - (β - dimethylamino - α - methylethyl) - 9 - xanthenecarbonylpyrrolidine thus obtained melts at about 129–130° C.

Example 11

In the procedure of the preceding example, α-chloro-β-dimethylaminopropane is substituted for the β-chloropropyldimethylamine. There is thus obtained 9-(β-dimethylaminopropyl) - 9 - xanthenecarbonylpyrrolidine which melts at about 113–115° C.

Example 12

A mixture of 28 parts of 9-xanthenecarbonylpyrrolidine, 5 parts of sodamide and 450 parts of anhydrous toluene is stirred and refluxed for an hour and then treated in the course of 30 minutes by the gradual addition of 17 parts of β-chloroethyldiallylamine. Refluxing is continued for 2 hours after which the mixture is cooled and treated with ethanol and dilute hydrochloric acid. The aqueous layer is separated, washed with ether and then warmed to expel the ether. After charcoal decolorization the solution is cooled and treated with an excess of ammonium hydroxide whereby an oil is precipitated which solidifies quickly. There is thus obtained the 9-(β-diallylaminoethyl)-9-xanthenecarbonylpyrrolidine which melts at about 67–69° C.

Example 13

By substituting β-chloroethyldipropylamine for the β-chloroethyldiallylamine used in the preceding example, there is obtained 9-(β-di-n-propylaminoethyl)-9-xanthenecarbonylpyrrolidine melting at about 58–60° C.

Example 14

A mixture of 27.9 parts of 9-xanthenecarbonylpyrrolidine, 5 parts of sodamide and 450 parts of anhydrous toluene is stirred at incipient reflux for 90 minutes and then treated with 17 parts of β-chloroethyldiisopropylamine. Refluxing is continued for 6 hours after which the mixture is cooled, treated with ethanol, then with water and then with dilute hydrochloric acid. The aqueous layer is separated, washed with ether, heated on the steam bath to expel the organic solvent and rendered alkaline by addition of ammonium hydroxide. On standing a solid precipitate forms which is decolorized by treatment with charcoal in a mixture of benzene and ethyl ether. On treatment with alcoholic hydrogen chloride there is obtained a crystalline hydrochloride which, recrystallized from a mixture of isopropanol and ethyl acetate, melts at about 250–251° C. Analysis shows the compound to be the hydrochloride of 9-(β-diisopropylaminoethyl)-9-xanthenecarbonylpyrrolidine.

Example 15

A mixture of 26 parts of xanthene-9-carbonylpiperidine, 6 parts of sodamide and 360 parts of dry toluene is refluxed for 90 minutes and then treated by gradual addition with 15 parts of β-chloroethyldiethylamine. Refluxing is continued for 2 hours after which the mixture is cooled, treated with ethanol, water and dilute hydrochloric acid. The aqueous layer is separated, washed with ether, heated to expel all of the dissolved ether, stirred with charcoal and filtered. The cooled solution is rendered alkaline by addition of ammonium hydroxide whereupon an oil separates which solidifies on standing. The 9-(β-diethylaminoethyl)-9-xanthenecarbonylpiperidine thus obtained melts at about 64–67° C.

Example 16

A mixture of 20 parts of 9-xanthenecarbonylpiperidine, 4 parts of sodamide and 450 parts of anhydrous toluene is refluxed for an hour and then treated in the course of 30 minutes with 14 parts of β-chloroethyldiisopropylamine. After refluxing for 5 hours, the mixture is cooled and treated with ethanol, water and dilute hydrochloric acid. The aqueous layer is separated, rendered alkaline and extracted with ether. The ether extract is dried over anhydrous calcium carbonate, filtered and evaporated to yield 9-(β-diisopropylaminoethyl)-9-xanthenecarbonylpiperidine which is distilled at 212–214° C. at 1 mm. pressure.

Treatment of a solution of the base in a mixture of benzene and ether with alcoholic hydrogen chloride and partial concentration yields a solid residue which, recrystallized from isopropanol, ethyl acetate and ether, melts at about 204–205° C.

Example 17

A mixture of 28 parts of 9-xanthenecarbonylpyrrolidine, 5 parts of sodamide and 450 parts of dry toluene is refluxed with stirring for 90 minutes and then treated in the course of 45 minutes with 15 parts of N-(β-chloroethyl)pyrrolidine. Refluxing is continued for 5 hours after which the mixture is cooled and treated with water and dilute hydrochloric acid. The aqueous layer is separated, rendered alkaline and extracted with ether. The ether layer is dried over anhydrous calcium sulfate, filtered and evaporated to yield 9-(β-pyrrolidinoethyl)-9-xanthenecarbonylpyrrolidine which melts at about 123–124° C.

Example 18

A mixture of 27.9 parts of 9-xanthenecarbonylpyrrolidine, 5 parts of sodamide and 450 parts of anhydrous toluene is stirred and refluxed for an hour and then treated in the course of 10 minutes with 20 parts of α-chloro-γ-bromopropane. Refluxing is resumed for 4 hours after which one adds ethanol and water. The mixture is dried and the solvents are distilled off to leave 9-(γ-chloropropyl)-9-xanthenecarbonylpyrrolidine as an oil.

A mixture of 25 parts of 9-(γ-chloropropyl)-9-xanthenecarbonylpyrrolidine, 15 parts of sodium iodide, 20 parts of pyrrolidine and 80 parts of butanone is refluxed for 12 hours and then cooled and extracted with dilute hydrochloric acid. The extract is rendered alkaline and extracted with ether. This ether extract is dried over anhydrous potassium carbonate, filtered and evaporated to yield 9-(γ-pyrrolidinopropyl)-9-xanthenecarbonylpyrrolidine melting at about 153–154° C. after recrystallization from a mixture of benzene and petroleum ether.

Example 19

A stirred mixture of 28 parts of 9-xanthenecarbonylpyrrolidine, 5 parts of sodamide and 450 parts of anhydrous toluene is stirred and refluxed for an hour and then treated with 16.5 parts of N-(β-chloroethyl)-2,5-dimethylpyrrolidine in the course of 30 minutes. Refluxing is resumed for 2 hours after which the mixture is cooled and treated with ethanol, water and dilute hydrochloric acid. The aqueous layer is separated, washed with ether, warmed to expel all of the dissolved ether, stirred with charcoal, filtered, cooled and treated with a sufficient amount of ammonium hydroxide to make the solution weakly basic. Thereupon an oil separates which solidifies on standing. There is thus obtained 9-(2,5-dimethylpyrrolidinoethyl) - 9 - xanthenecarbonylpyrrolidine which melts at about 119–121° C. and has the structural formula

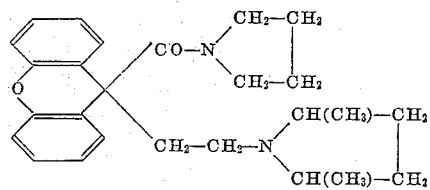

Example 20

A mixture of 14 parts of 9-xanthenecarbonylpyrrolidine, 6 parts of sodamide and 450 parts of toluene is stirred and refluxed for 45 minutes and then treated with 9 parts of N-(β-chloroethyl)piperidine. Refluxing is resumed for 2 hours after which the mixture is cooled and treated with alcohol, water and dilute hydrochloric acid. The aqueous layer is separated, washed with ether, heated to evaporate all ether and rendered alkaline with ammonium hydroxide to cause precipitation of the solid basic product. On recrystallization from benzene and petroleum ether and charcoal decolorization there is obtained 9-(β-piperidinoethyl)-9-xanthenecarbonylpyrrolidine melting at about 152–153° C.

Substitution of N-(β-chloroethyl)-2,6-lupetidine hydrochloride for the β-chloroethylpiperidine hydrochloride in the foregoing procedure yields 9-[β-(2,6-lupetidino)-ethyl]-9-xanthenecarbonylpyrrolidine which melts at about 145–147° C.

Example 21

A mixture of 658 parts of 9-xanthenecarboxylic acid, 400 parts of thionyl chloride and 2400 parts of toluene is refluxed for 2 hours, concentrated in vacuo to about one-half of its original volume and then filtered. To the filtrate are added 900 parts of morpholine and 1200 parts of toluene and upon mixing a heavy precipitate is formed. After standing at room temperature for 6 hours the mixture is cooled and the precipitate is collected on a filter. The precipitate is then digested with water containing a small amount of acid, cooled, once more collected on the filter and dried. 15 parts of 9-xanthenecarbonylmorpholine thus obtained are refluxed for 2 hours with 3 parts of sodamide and 350 parts of anhydrous toluene and then treated with 10 parts of β-chloroethyldiethylamine. Refluxing is resumed for 2 hours after which the mixture is cooled and treated successively with ethanol, water and dilute hydrochloric acid. The aqueous layer is separated, warmed to expel any solvent, cooled and treated with an excess of ammonium hydroxide to precipitate a heavy oil which is taken up in ether and treated with one equivalent of alcoholic hydrogen chloride. The resulting precipitate is recrystallized from dilute isopropanol to yield the hydrochloride of 9-(β-diethylaminoethyl)-9-xanthenecarbonylmorpholine melting at about 228–229° C.

Example 22

A mixture of 14 parts of 9-xanthenecarbonylpyrrolidine, 6 parts of sodamide and 450 parts of anhydrous toluene is refluxed for 45 minutes and then treated with 12 parts of N-(β-chloroethyl)morpholine. Refluxing is resumed for 2 hours after which the mixture is cooled, treated successively with ethanol, water, and dilute hydrochloric acid. The aqueous layer is separated, washed with ether, warmed to remove all organic solvent and then rendered alkaline by addition of ammonium hydroxide to yield crystalline 9-(β-morpholinoethyl)-9-xanthenecarbonylpyrrolidine melting at about 168–169° C.

*Example 23*

A mixture of 58 parts of 9-xanthenecarbonylpyrrolidine, 10 parts of sodamide and 450 parts of anhydrous toluene is refluxed for an hour and then treated in the course of 30 minutes with 25 parts of β-chloroethyl vinyl ether. Refluxing is then continued for 3 hours after which ethanol and water are added. The mixture is dried over anhydrous calcium sulfate and the solvents are removed by distillation. To the oily 9-(β-vinyloxyethyl)-9-xanthenecarbonylpyrrolidine thus obtained are added 450 parts of hot water and 25 parts of concentrated hydrochloric acid. The mixture is heated with occasional stirring for 12 hours. Then the supernatant liquid is decanted and the residue is dissolved in warm benzene, dried and evaporated.

To a solution of 65 parts of the 9-(β-hydroxyethyl)-9-xanthenecarbonylpyrrolidine thus obtained in 750 parts of chloroform are added with ice cooling and stirring 37 parts of thionyl chloride. The mixture is refluxed for 2 hours during which time sulfur dioxide and hydrochloric acid are evolved. The mixture is then washed with water, dried over anhydrous calcium sulfate and distilled under vacuum to leave a dark oil.

A mixture of 30 parts of 9-(β-chloroethyl)-9-xanthenecarbonylpyrrolidine thus obtained, 15 parts of N-(β-hydroxyethyl)methylamine, 15 parts of sodium iodide and 80 parts of butanone is refluxed for 12 hours and then concentrated to dryness and treated with dilute hydrochloric acid and ether. The aqueous layer is separated, filtered, decolorized with charcoal and then treated with an excess of ammonium hydroxide and extracted with ether. The ether extract is dried over anhydrous calcium sulfate, filtered and evaporated to yield 9-[β-(N-hydroxyethyl-N-methylamino)ethyl]-9-xanthenecarbonylpyrrolidine which is distilled at about 245–250° C. and 1 mm. pressure. The compound has the structural formula

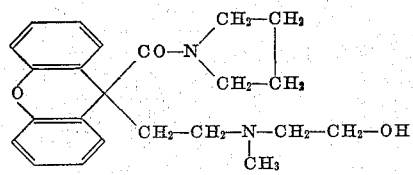

*Example 24*

Using the procedure of the preceding axample but substituting N-(β-hydroxyethyl)ethylamine for the N-(β-hydroxyethyl)methylamine there is obtained 9-[β-(N-β-hydroxyethyl-N-ethylamino)ethyl] - 9 - xanthenecarbonylpyrrolidine which is distilled at about 268–272° C. and 1 mm. pressure. The distillate solidifies on standing and on crystallization from ethyl acetate melts at about 137–138° C.

Similar substitution of dimethylamine for the N-(β-hydroxyethyl)methylamine yields 9 - (β - dimethylaminoethyl)-9-xanthenecarbonylpyrrolidine which melts at about 135° C.

*Example 25*

A mixture of 15 parts of the methyl ester of 9-(β-diethylaminoethyl)-9-xanthenecarboxylic acid, 50 parts of β-hydroxyethylamine in 100 parts of methanol and 0.05 part of sodium ethoxide are maintained in a shielded pressure reactor for 3 days at 80° C., cooled and concentrated until most of the solvent has been evaporated. The residue is recrystallized from ethyl acetate to yield 9 - (β - diethylaminoethyl) - N - (β - hydroxyethyl)-9-xanthenecarboxamide. The latter is dissolved in acetone and treated with a slight excess of hydrogen chloride in isopropanol. On refrigeration a solid hydrochloride precipitates which has the structural formula

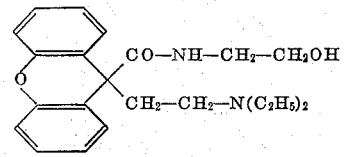

*Example 26*

A stirred mixture of 37 parts of 9-xanthenecarbonyl chloride, 35 parts of 2,6-lupetidine and 170 parts of anhydrous toluene is maintained at 70° C. for 10 hours and then washed with dilute hydrochloric acid and water and dried over anhydrous magnesium sulfate. The solvent is evaporated to leave 9-xanthenecarbonyllupetidine as a thick oil. 22 parts of this oil are refluxed for 2 hours with 4 parts of sodamide and 260 parts of anhydrous toluene and then treated with 15 parts of β-chloroethyldiethylamine. Refluxing is resumed for 2 hours after which the mixture is cooled and treated successively with ethanol, water and dilute hydrochloric acid. The aqueous layer is separated and treated with an excess of ammonium hydroxide to precipitate the oily base, which is distilled at about 250–260° C. and 2 mm. pressure. Treatment of an ether solution of the base with one equivalent of alcoholic hydrogen chloride yields the initially oily hydrochloride which solidifies after a short time. The hydrochloride of 9-(β-diethylaminoethyl)-9-xanthenecarbonyllupetidine, crystallized from acetone, melts at about 226–227° C. The base has the structural formula

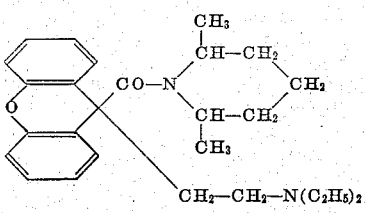

*Example 27*

Under a nitrogen atmosphere 130 parts of a 0.179 molar solution of butyllithium in ether are added with stirring to a solution of 55 parts of 9-xanthenecarbonylpyrrolidine in 350 parts of ether. The resulting mixture is maintained at 0° C. while 47 parts of β-chloroethyl p-toluenesulfonate in 35 parts of ether are added. The mixture is hydrolyzed with a mixture of 36 parts of concentrated hydrochloric acid and 60 parts of water. The hydrolyzed reaction mixture is extracted with benzene and the extract is washed with water, dried over anhydrous potassium carbonate, filtered and concentrated. The residue is recrystallized from petroleum ether to yield 9 - (β - chloroethyl) - 9 - xanthenecarbonylpyrrolidine melting at about 111–119° C.

A stirred mixture of 15 parts of this product, 4 parts of 4-pipecoline, 7 parts of potassium carbonate, 1 part of sodium iodide and 160 parts of butanone is stirred and refluxed for 6 hours and filtered after cooling. The filtrate is concentrated and treated with dilute hydrochloric acid and toluene. After warming, the hydrochloric acid layer is separted, stirred with charcoal, filtered, chilled and then treated with an excess of ammonium hydroxide to yield a heavy oil. The latter solidifies after a a short time. The resulting powder is ground and dried. The 9 - (4 - pipecolinoethyl) - 9 - xanthenecarbonylpyrrolidine thus obtained melts at about 143–144° C. It has the structural formula

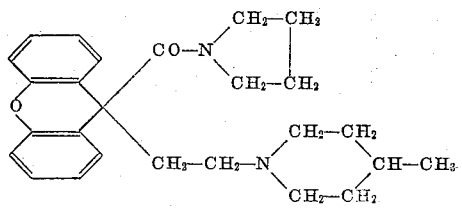

Example 28

A mixture of 27 parts of 9-xanthenecarbonylpyrrolidine, 39 parts of sodamide and 450 parts of anhydrous toluene is refluxed for an hour and then treated slowly with 7.2 parts of 1-methyl-2-chloromethylpiperidine. Refluxing is resumed for 2 hours after which the mixture is cooled and treated successively with ethanol, water and dilute hydrochloric acid. The aqueous layer is separated, washed with ether and then warmed to expel the dissolved ether. After charcoal decolorization and cooling an excess of ammonium hydroxide is added. The oily base is separated and dissolved in petroleum ether. On concentration of this solution and standing there separates 9-(4'-methyl-3'-piperidinomethyl)-9-xanthencarbonylpyrrolidine melting at about 110–113° C. The compound has the structural formula

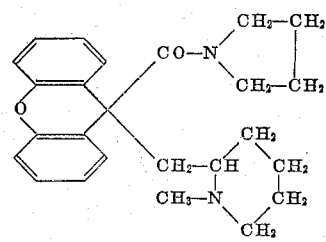

Example 29

A stirred mixture of 19.6 parts of 9-xanthenecarbonylpyrrolidine, 39 parts of sodamide and 450 parts of dry toluene is refluxed for an hour and then treated by slow addition with 11.5 parts of N-methyl-2-(β-chloroethyl)-piperidine. Refluxing is resumed for 2 hours after which the reaction mixture is treated successively with ethanol, water, and dilute hydrochloric acid. The aqueous layer is washed with ether, warmed to expel the dissolved ether, stirred with charcoal and filtered. The filtrate is cooled and treated with an excess of ammonium hydroxide to precipitate the initially oily 9-(4'-methyl-3'-piperidinoethyl)-9-xanthenecarbonylpyrrolidine, which solidifies within a short time to form crystals melting at about 195–196° C. The compound has the structural formula

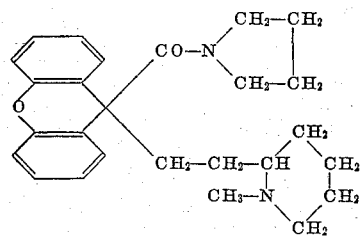

Example 30

A stirred mixture of 16 parts of 9-xanthenecarbonylpyrrolidine, 3 parts of sodamide and 240 parts of anhydrous toluene is refluxed for an hour after which 10 parts of γ-chloropropylthiamorpholine are added rapidly. The mixture is refluxed and stirred for 2 hours, cooled and treated successively with alcohol, water and dilute hydrochloric acid. The toluene layer is discarded and the residue is treated with an excess of ammonium hydroxide. A heavy oil forms which is separated. After short standing 9-(γ-thiamorpholinopropyl)-9-xanthenecarbonylpyrrolidine precipitates. The base is crystallized with charcoal purification first from a mixture of benzene and petroleum ether and then from ethyl acetate to yield crystals melting at about 152–153° C.

Example 31

A stirred mixture of 20 parts of 9-xanthenecarbonylpyrrolidine, 4 parts of sodamide and 260 parts of anhydrous toluene is refluxed for 2 hours and then treated by rapid addition with 8.1 parts of 1-(β-chloroethyl)-4-methylpiperazine. After refluxing for 3 hours the mixture is cooled and treated successively with ethanol, water and dilute hydrochloric acid. The aqueous layer is separated, washed with ether, stirred with charcoal, filtered and then warmed on the steam bath to expel the dissolved ether. The mixture is filtered and the filtrate is cooled and treated with an excess of ammonium hydroxide to yield a heavy oil which solidifies rapidly on standing. The 9-(4'-methylpiperazinoethyl)-9-xanthenecarbonylpyrrolidine thus obtained melts at about 143–144° C. It has the structural formula

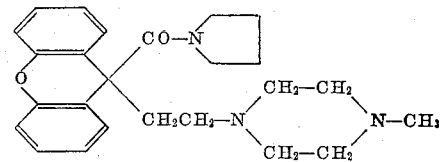

By substituting 8.1 parts of 1-(γ-chloropropyl)piperazine for the β-chloroethyl derivative used above, there is obtained 9-(γ-piperazinopropyl)-9-xanthenecarbonylpyrrolidine.

What is claimed is:

1. A xanthenecarboxamide of the structural formula

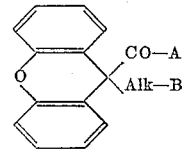

wherein Alk is a lower alkylene radical and wherein A and B are members of the class consisting of amino radicals, lower alkylamino radicals, di-(lower alkyl)amino, di-(lower alkenyl)amino radicals, lower hydroxyalkylalkylamino radicals, morpholino radicals, thiamorpholino radicals, piperazino radicals, lower alkylpiperazino radicals and radicals of the type

wherein Z is a lower alkylene radical containing 4 to 7 carbon atoms of which 4 to 5 are in nuclear position.

2. A xanthenecarboxamide of the structural formula

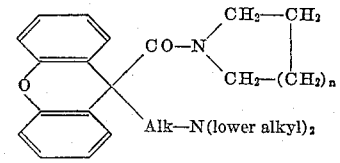

wherein $n$ is a positive integer less than 3 and Alk is a lower alkylene radical.

3. A xanthenecarboxamide of the structural formula

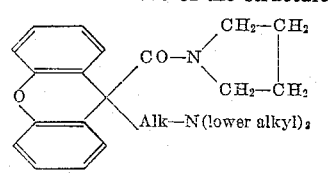

wherein Alk is a lower alkylene radical.

4. 9 - (β - dimethylaminoethyl) - 9 - xanthenecarbonylpyrrolidine.

5. A 9 - (di - lower alkenylamino - lower alkyl)-9-xanthenecarbonylpyrrolidine.

6. A 9 - (diallylamino - lower alkyl) - 9 - xanthenecarbonylpyrrolidine.

7. A xanthenecarboxamide of the structural formula

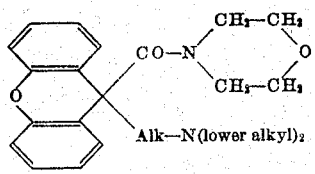

wherein Alk is a lower alkylene radical.

8. A compound of the structural formula

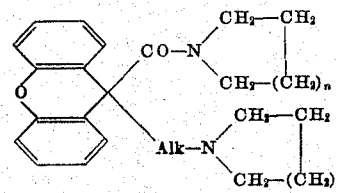

wherein $n$ is a positive integer less than 3 and Alk is a lower alkylene radical.

9. A 9 - (lower pyrrolidinoalkyl) - 9 - xanthenecarbonylpyrrolidine.

10. A xanthenecarboxamide of the structural formula

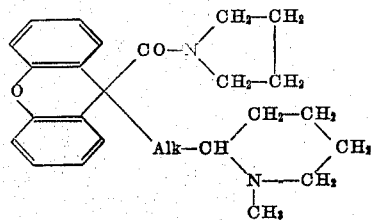

wherein Alk is a lower alkylene radical.

11.

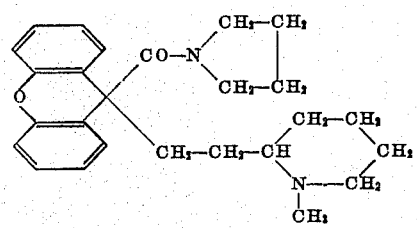

No references cited.